US012784997B2

(12) United States Patent
Lin et al.

(10) Patent No.: US 12,784,997 B2
(45) Date of Patent: Nov. 3, 2026

(54) METHOD FOR MANUFACTURING SEMI-SOLID ELECTROLYTIC CAPACITOR

(71) Applicant: APAQ TECHNOLOGY CO., LTD., Miaoli County (TW)

(72) Inventors: Chieh Lin, Hsinchu County (TW); Chung-Jui Su, Kaohsiung City (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 373 days.

(21) Appl. No.: 18/408,649

(22) Filed: Jan. 10, 2024

(65) Prior Publication Data

US 2024/0312727 A1 Sep. 19, 2024

(30) Foreign Application Priority Data

Mar. 17, 2023 (TW) ................................ 112109876

(51) Int. Cl.

| | |
|---|---|
| ***H01G 9/15*** | (2006.01) |
| ***C08F 234/02*** | (2006.01) |
| ***C08F 234/04*** | (2006.01) |
| ***H01G 9/028*** | (2006.01) |
| ***H01G 9/035*** | (2006.01) |
| ***H01M 10/0565*** | (2010.01) |

(52) U.S. Cl.

CPC ............ *H01G 9/15* (2013.01); *C08F 234/02* (2013.01); *C08F 234/04* (2013.01); *H01G 9/028* (2013.01); *H01G 9/035* (2013.01); *H01M 10/0565* (2013.01); *H01M 2300/0082* (2013.01); *H01M 2300/0085* (2013.01)

(58) Field of Classification Search

CPC .......... H01G 9/15; H01G 9/028; H01G 9/035; H01G 9/0036

See application file for complete search history.

(56) References Cited

U.S. PATENT DOCUMENTS

2005/0219802 A1* 10/2005 Kobayashi ........... H01G 9/0032 361/523
2007/0085061 A1* 4/2007 Elder ..................... H01G 9/028 252/500
2007/0278453 A1* 12/2007 Zahn .................... C08G 61/124 252/500
2022/0130619 A1* 4/2022 Lin ........................ C08G 61/12

FOREIGN PATENT DOCUMENTS

CN 112837940 A * 5/2021 ............... H01G 9/14
CN 114496578 A * 5/2022 ............... H01G 9/15

* cited by examiner

*Primary Examiner* — Scott B Geyer
(74) *Attorney, Agent, or Firm* — Li & Cai Intellectual Property (USA) Office

(57) ABSTRACT

A method for manufacturing a semi-solid electrolytic capacitor includes: providing a capacitor element; impregnating the capacitor element with a dispersant; baking the capacitor element impregnated with the dispersant; impregnating the baked capacitor element with an electrolyte; and packaging the capacitor element impregnated with the electrolyte. The dispersant is a conductive polymer formed from at least one of polythiophene having at least one sulfonic acid group and polyselenophene having at least one sulfonic acid group.

7 Claims, No Drawings

METHOD FOR MANUFACTURING SEMI-SOLID ELECTROLYTIC CAPACITOR

CROSS-REFERENCE TO RELATED PATENT APPLICATION

This application claims the benefit of priority to Taiwan Patent Application No. 112109876, filed on Mar. 17, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for manufacturing an electrolytic capacitor, and more particularly to a method for manufacturing a semi-solid electrolytic capacitor.

BACKGROUND OF THE DISCLOSURE

Capacitors are widely used in various electronic devices. According to different dielectric materials, existing capacitors can be classified into liquid capacitors or solid capacitors. The dielectric material of the liquid capacitor is an electrolyte, and advantages of the liquid capacitor include having a large capacity, having a high withstand voltage value, and being inexpensive. However, the electrolyte will have an increased volume or generate bubbles when under heat, which may easily result in combustion of the electrolyte.

In comparison, the dielectric material of the solid capacitor is a conductive polymer, and advantages of the solid capacitor include being eco-friendly, having low impedance, being heat-resistant, and having high reliability and a long service life. Hence, the solid capacitor is currently widely used in high-quality electronic products, such as a computer, a video camera, an LED billboard, a game console, a liquid-crystal display, and a communication base station. However, since the solid capacitor has high manufacturing costs, there is still room for improvement in the existing capacitor.

SUMMARY OF THE DISCLOSURE

In response to the above-referenced technical inadequacy, the present disclosure provides a method for manufacturing a semi-solid electrolytic capacitor.

In order to solve the above-mentioned problem, one of the technical aspects adopted by the present disclosure is to provide a method for manufacturing a semi-solid electrolytic capacitor. The method includes: providing a capacitor element; impregnating the capacitor element with a dispersant; baking the capacitor element impregnated with the dispersant, so as to form a conductive solid layer; impregnating the baked capacitor element with an electrolyte, so that the electrolyte seeps into a gap of the conductive solid layer; and packaging the capacitor element impregnated with the electrolyte. The dispersant is a conductive polymer formed from a polymerizing monomer that includes at least one of polythiophene having at least one sulfonic acid group and polyselenophene having at least one sulfonic acid group.

Therefore, in the method for manufacturing the semi-solid electrolytic capacitor provided by the present disclosure, by virtue of "impregnating the capacitor element with a dispersant, in which the dispersant is a conductive polymer formed from a polymerizing monomer that includes at least one of polythiophene having at least one sulfonic acid group and polyselenophene having at least one sulfonic acid group" and "impregnating the baked capacitor element with an electrolyte, so that the electrolyte seeps into a gap of the conductive solid layer," electrical performance of a capacitor will not be overly compromised whilst manufacturing costs of the capacitor can be reduced.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

For a semi-solid electrolytic capacitor, a conductive solid layer and an electrolyte formed by conductive polymers are mixed and filled in a capacitor element. In the present disclosure, a method for manufacturing the semi-solid electrolytic capacitor at least includes processes of: providing the capacitor element; impregnating the capacitor element with a dispersant; baking the capacitor element impregnated with the dispersant, so as to form the conductive solid layer; impregnating the baked capacitor element with the electrolyte, so that the electrolyte seeps into a gap of the conductive solid layer; and packaging the capacitor element impregnated with the electrolyte.

Specifically, in the method of the present disclosure, the process of providing the capacitor element includes cutting, stitching and winding, soldering, carbonization, formation, and heat treatment. That is, according to capacitance parameters, a metal foil is cut into an anode foil, a cathode foil, and an electrolytic paper. Through rivet bonding, a positive pin and a negative pin are respectively connected to the anode foil and the cathode foil of the metal foil. Then, the anode foil, the cathode foil, and the electrolytic paper are wound into the capacitor element. Afterwards, the capacitor element is soldered onto a bar for facilitating a carbonization process and a formation process.

In the carbonization process, the capacitor element is impregnated with a carbonating solution, and is then disposed in a carbonization furnace for carbonization. In this way, fibers of the electrolytic paper are destroyed, and a conductive structure that is loose and porous is formed. In the formation process, the capacitor element is impregnated with a forming solution, so as to repair an oxide film of the metal foil that is damaged at its edge during cutting and prevent electrical leakage and short-circuiting. Furthermore, when the heat treatment is carried out after the formation process, small crystals are formed outside of an anodically produced film, thereby increasing a dielectric constant.

In one embodiment of the present disclosure, incoming quality control (ICQ) can be conducted before the process of providing the capacitor element. Through sampling, the quality of raw materials is inspected to prevent poor raw materials from directly entering a production line (which may result in a poor yield).

Hence, in the process of providing the capacitor element, the provided capacitor element refers to a capacitor element that has already undergone the carbonization process and the formation process. In the method of the present disclosure, the process of impregnating the capacitor element with the dispersant indicates direct immersion of the capacitor element in the dispersant. The dispersant contains a conductive polymer, and the conductive polymer can be formed from at least one of polythiophene having at least one sulfonic acid group (as shown in formula (I)) and polyselenophene having at least one sulfonic acid group (as shown in formula (II)).

formula (I)

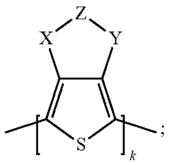

formula (II)

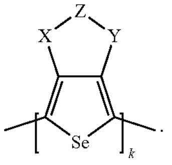

In formula (I) and formula (II), k is an integer ranging from 1 to 50, and X and Y are each independently selected from the group consisting of an oxygen atom, a sulfur atom, and $-NR^1$. $R^1$ is selected from the group consisting of a hydrogen atom, a substituted or unsubstituted alkyl group having 1 to 18 carbon atoms, and a substituted or unsubstituted aromatic group having 5 to 14 carbon atoms.

The above-mentioned alkyl group having 1 to 18 carbon atoms can be methyl, ethyl, n-propyl, isopropyl, n-butyl, isobutyl, sec-butyl, tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, or n-octyl. Preferably, $R^1$ is an alkyl group having 1 to 4 carbon atoms.

In formula (I) and formula (II), a substituent Z is $-(CH_2)_m-CR^2R^3-(CH_2)_n-$. Here, m is an integer ranging from 0 to 3, and n is an integer ranging from 0 to 3. In the present disclosure, m can be 0, 1, 2, or 3 when m is the integer ranging from 0 to 3, and "$-(CH_2)-$" represents methylene. In other words, a carbon number or a chain length of the substituent Z can be changed according to values of m and n. For example, when m and n are both 0, the substituent Z is "$-CR^2R^3$", and a pentacyclic structure is formed by X, Z, and Y in formula (I) and third and fourth carbon atoms of a thiophene ring. When a sum of m and n is 1, the substituent Z is "$-(CH_2)-CR^2R^3-$", and a hexacyclic structure (as shown from formula (VII) to formula (XII)) is formed by X, Z, and Y in formula (I) and the third and fourth carbon atoms of the thiophene ring. Similarly, a hexacyclic structure (as shown from formula (XIII) to formula (XVIII)) can be formed by X, Z, and Y in formula (II) and third and fourth carbon atoms of a selenophene ring.

In the substituent Z, $R^2$ is selected from the group consisting of a hydrogen atom, $-(CH_2)_p-O-(CH_2)_q-SO_3^-M^+$, $-(CH_2)_p-NR^4[(CH_2)_q-SO_3^-M^+]$, $-(CH_2)_p-NR^4[Ar-SO_3^-M^+]$, and $-(CH_2)_p-O-Ar-[(CH_2)_q-SO_3^-M^+]_r$. $R^3$ is selected from the group consisting of $-(CH_2)_p-O-(CH_2)_q-SO_3^-M^+$, $-(CH_2)_p-NR+[(CH_2)_q-SO_3^-M^+]$, $-(CH_2)_p-NR^4[Ar-SO_3^-M^+]$, and $-(CH_2)_p-O-Ar-[(CH_2)_q-SO_3^-M^+]_r$. In addition, in each of $R^2$ and $R^3$, p is an integer ranging from 0 to 6, q is 0 or 1, r is an integer ranging from 1 to 4, and Ar is an arylene group. $R^4$ is selected from the group consisting of a hydrogen atom, a substituted or unsubstituted alkyl group having 1 to 18 carbon atoms, and a substituted or unsubstituted aromatic group having 5 to 14 carbon atoms. $M^+$ is a metal cation. In one embodiment, $M^+$ can be a lithium ion, a sodium ion, a potassium ion, or an ammonium ion.

Based on the above, the conductive polymer in formula (I) of the present disclosure does not include poly(3,4-ethylenedioxythiophene) (PEDOT). That is to say, the conductive polymer of the present disclosure is different from conductive polymers currently available on the market, but good electrical properties can still be obtained.

In one exemplary embodiment, when X and Y in formula (I) and formula (II) are both oxygen atoms, the polythiophene having at least one sulfonic acid group is shown in formula (III), and the polyselenophene having at least one sulfonic acid group is shown in formula (V). In another exemplary embodiment, when X and Y in formula (I) and formula (II) include the oxygen atom and the sulfur atom, the polythiophene having at least one sulfonic acid group is shown in formula (IV), and the polyselenophene having at least one sulfonic acid group is shown in formula (VI).

formula (III)

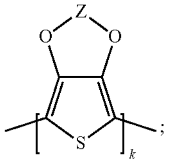

-continued formula (IV)

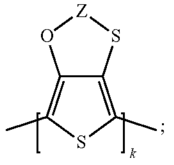

formula (V)

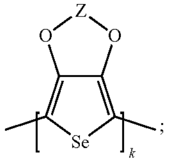

formula (VI)

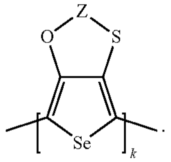

In formula (III) to formula (VI), k is an integer ranging from 1 to 50, and the substituent Z is $—(CH_2)_m—CR^2R^3—(CH_2)_n—$. Here, m is an integer ranging from 0 to 3, and n is an integer ranging from 0 to 3. In the substituent Z, $R^2$ is selected from the group consisting of a hydrogen atom, $—(CH_2)_p—O—(CH_2)_q—SO_3^-M^+$, $—(CH_2)_p—NR^4[(CH_2)_q—SO_3^-M^+]$, $—(CH_2)_p—NR^4[Ar—SO_3^-M^+]$, and $—(CH_2)_p—O—Ar—[(CH_2)_q—SO_3^-M^+]_r$. $R^3$ is selected from the group consisting of $—(CH_2)_p—O—(CH_2)_q—SO_3^-M^+$, $—(CH_2)_p—NR^4[(CH_2)_q—SO_3^-M^+]$, $—(CH_2)_p—NR^4[Ar—SO_3^-M^+]$, and $—(CH_2)_p—O—Ar—[(CH_2)_q—SO_3^-M^+]_r$. In each of $R^2$ and $R^3$, p is an integer ranging from 0 to 6, q is 0 or 1, r is an integer ranging from 1 to 4, and Ar is an arylene group. $R^4$ is selected from the group consisting of a hydrogen atom, a substituted or unsubstituted alkyl group having 1 to 18 carbon atoms, and a substituted or unsubstituted aromatic group having 5 to 14 carbon atoms. $M^+$ is a metal cation. In one embodiment, $M^+$ can be a lithium ion, a sodium ion, a potassium ion, or an ammonium ion.

In one exemplary embodiment, when X and Y are both oxygen atoms, and a sum of m and n is 1, the polythiophene having at least one sulfonic acid group is shown in at least one of formula (VII) to formula (XII), and the polyselenophene having at least one sulfonic acid group is shown in at least one of formula (XIII) to formula (XVIII).

formula (VII)

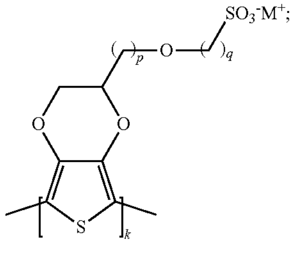

-continued formula (VIII)

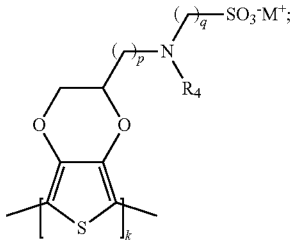

formula (IX)

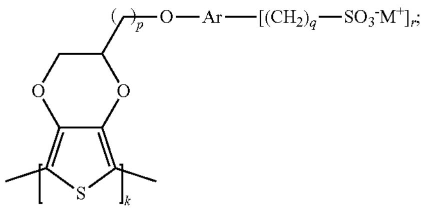

formula (X)

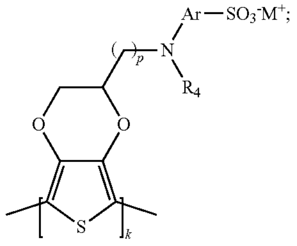

formula (XI)

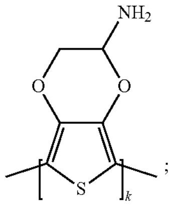

formula (XII)

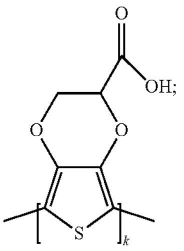

formula (XIII)

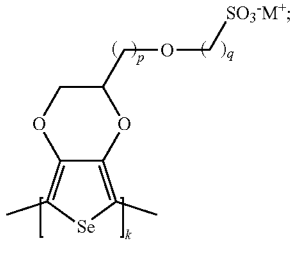

-continued formula (XIV)

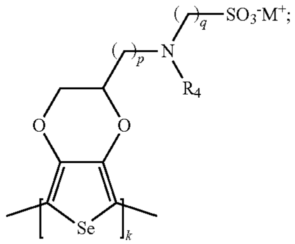

formula (XV)

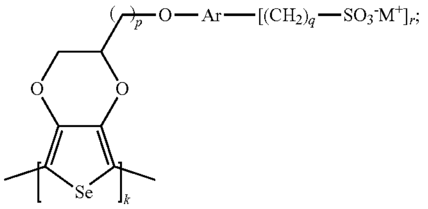

formula (XVI)

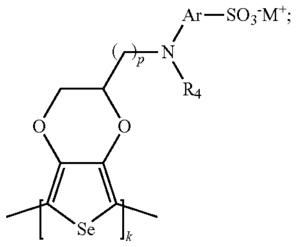

formula (XVII)

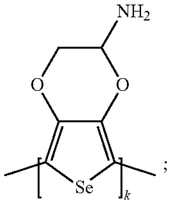

formula (XVIII)

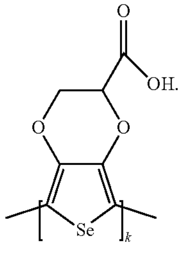

In formula (VII) to formula (XVIII), k is an integer ranging from 1 to 50. Here,

 and 

represent methylene, and are present in the form of a carbon-carbon bond for brevity (the same as the above-mentioned "—$(CH_2)$—"). In formula (VII) to formula (XVIII), p is an integer ranging from 0 to 6, q is 0 or 1, r is an integer ranging from 1 to 4, and Ar is an arylene group. $R^4$ is selected from the group consisting of a hydrogen atom, a substituted or unsubstituted alkyl group having 1 to 18 carbon atoms, and a substituted or unsubstituted aromatic group having 5 to 14 carbon atoms. $M^+$ is a metal cation. In one embodiment, $M^+$ can be a lithium ion, a sodium ion, a potassium ion, or an ammonium ion.

The dispersant of the present disclosure contains the conductive polymer, a polyanion, and a dispersion medium. Based on a total weight of the dispersant being 100 wt %, an amount of the conductive polymer ranges between 0.1 wt % and 20 wt % (preferably between 10 wt % and 15 wt %), so as to facilitate manufacturing of the semi-solid electrolytic capacitor. Furthermore, the conductive polymer can be formed by polymerization of polymerizing monomers that are the same or by polymerization of two or three different polymerizing monomers.

In one embodiment of the present disclosure, during the process of impregnating the capacitor element with the dispersant, the capacitor element is impregnated with the dispersant for one to three times. Moreover, the type of the dispersant used for impregnation of the capacitor element can be more than one. That is to say, the dispersant can at least contain a first dispersant and a second dispersant. The first dispersant and the second dispersant have different conductive polymers, or the conductive polymer of the first dispersant is different from that of the second dispersant in terms of concentration. In the present disclosure, the term "polymer" includes any compound that has more than one repeating unit, and the repeating units can be the same or different from each other.

In one embodiment of the present disclosure, the capacitor element is impregnated with the first dispersant for one to three times, and is then impregnated with the second dispersant for one to three times. In another embodiment of the present disclosure, the capacitor element is alternately impregnated with the first dispersant and the second dispersant for one to three times. However, the aforementioned examples describe only one of the embodiments of the present disclosure, and the present disclosure is not intended to be limited thereto.

After each impregnation process is completed, the impregnated capacitor element is subject to a drying treatment. That is, the dispersant on a surface of the capacitor element is dried by baking, so as to form the conductive solid layer. In one embodiment of the present disclosure, a baking temperature of from 100° C. to 150° C. is used for formation of the conductive solid layer by baking, and a baking time ranges between 20 minutes and 60 minutes. Preferably, the baking temperature ranges between 125° C. and 145° C., and the baking time ranges between 30 minutes and 40 minutes. In addition, the impregnation process and a baking process can be alternately repeated three to five times, and the baking temperature and the baking time can be different each time. In other words, the finally-formed conductive solid layer is produced by stacking layers of dried dispersants that include different components.

For example, in one embodiment of the present disclosure, after being impregnated with the first dispersant and baked at a temperature of 100° C. for thirty minutes, the capacitor element is once again impregnated with the first dispersant and baked at a temperature of 100° C. for forty minutes. Then, the capacitor element is impregnated with the second dispersant and baked at a temperature of 100° C. for fifty minutes, followed by being impregnated with the second dispersant and baked at a temperature of 100° C. for sixty minutes. This is to ensure that the dispersant used in each impregnation process is properly dried for formation of the conductive solid layer. However, the aforementioned examples describe only one of the embodiments of the present disclosure, and the present disclosure is not intended to be limited thereto.

In another embodiment of the present disclosure, after being impregnated with the first dispersant and baked at a temperature of 100° C. for thirty minutes, the capacitor element is impregnated with the second dispersant and baked at a temperature of 120° C. for thirty minutes. Then, the capacitor element is impregnated with the first dispersant and baked at a temperature of 140° C. for thirty minutes, followed by being impregnated with the second dispersant and baked at a temperature of 150° C. for sixty minutes. Through gradient heating, any negative influence caused by instant and dramatic temperature changes during a drying process can be prevented.

In yet another embodiment of the present disclosure, after being impregnated with the first dispersant and baked at a temperature of 100° C. for thirty minutes, the capacitor element is impregnated with the second dispersant and baked at a temperature of 120° C. for thirty minutes. Then, the capacitor element is impregnated with a third dispersant and baked at a temperature of 150° C. for thirty minutes, followed by being impregnated with the second dispersant and baked at a temperature of 120° C. for sixty minutes. Finally, the capacitor element is impregnated with the first dispersant and baked at a temperature of 100° C. for thirty minutes. In this embodiment, the baking temperature can be adjusted according to the temperature required for drying the dispersant, and the baking process may end at a relatively low temperature, so as to facilitate subsequent processes.

In still another embodiment of the present disclosure, after being impregnated with the second dispersant for three times and baked at a temperature of 125° C. for thirty minutes, the capacitor element is impregnated with the third dispersant for three times and baked at a temperature of 145° C. for thirty minutes. Then, the capacitor element is impregnated with the first dispersant for three times and baked at a temperature of 125° C. for thirty minutes, followed by being impregnated with the second dispersant for three times and baked at a temperature of 145° C. for thirty minutes. Finally, the capacitor element is impregnated with the third dispersant for three times and baked at a temperature of 125° C. for thirty minutes. In this embodiment, the conductive solid layer formed by the dispersant is thicker and more uniform.

Formation of the conductive solid layer on the capacitor element is followed by impregnation with the electrolyte. In the method of the present disclosure, by impregnating the capacitor element with the electrolyte, the electrolyte may seep into the gap of the conductive solid layer. In the embodiments of the present disclosure, the process of impregnating the baked capacitor element with the electrolyte is performed only once, and a conductivity of the electrolyte ranges between 0.01 mS and 2 mS. Specifically, the electrolyte can contain a solvent, lithium salts, and an additive, and an amount of the solvent is equal to or greater than 85 wt %. When the amount of the solvent is less than 85 wt %, dispersion of a mixer is not uniform.

For example, the solvent can be selected from the group consisting of γ-butyrolactone (GBL), sulfolane, ethylene glycol (EG), diethylene glycol, triethylene glycol, polyethylene glycol, and polypropylene glycol. Specifically, the solvent can be a mixture of at least two of the above-mentioned solvents, and is preferably a mixture of two to five of the solvents. In one embodiment of the present disclosure, the solvent is preferably a mixture of γ-butyrolactone and sulfolane at a ratio of 1:1. Compared with other solvents or mixtures thereof, such a solvent can further improve stability of the semi-solid electrolytic capacitor.

In the method of the present disclosure, the capacitor element impregnated with the electrolyte is further packaged. Specifically, the capacitor element is packaged in an aluminum casing for blocking external humidity, and washing of dirt on the aluminum casing and pins is followed by processes of aging and charging. According to practical requirements, the semi-solid electrolytic capacitor manufactured by the method of the present disclosure can be a DIP (dual in-line package) capacitor or an SMD (surface-mount device) capacitor, and final quality control (FQC) can be conducted to test and distinguish defective products from non-defective products.

Furthermore, product quality assurance (PQA) is implemented in the method of the present disclosure. Before shipment, outgoing quality control (OQC) will also be conducted to ensure the product quality of the semi-solid electrolytic capacitor.

BENEFICIAL EFFECTS OF THE EMBODIMENTS

In conclusion, in the method for manufacturing the semi-solid electrolytic capacitor provided by the present disclosure, by virtue of "impregnating the capacitor element with a dispersant, in which the dispersant is a conductive polymer formed from a polymerizing monomer that includes at least one of polythiophene having at least one sulfonic acid group and polyselenophene having at least one sulfonic acid group" and "impregnating the baked capacitor element with an electrolyte, so that the electrolyte seeps into a gap of the conductive solid layer," electrical performance of a capacitor will not be overly compromised whilst manufacturing costs of the capacitor can be reduced.

The method of the present disclosure can be used to manufacture a semi-solid electrolytic capacitor. A dielectric medium of the capacitor includes both the electrolyte and the conductive solid layer, and is suitable for an environment where a working voltage ranges between 16 V and 100 V. In addition, a withstand voltage of an aluminum foil is 1.6 to 2.2 times the working voltage. More specifically, in the entire dielectric medium, a content of the electrolyte is at least 20%, and is less than or equal to 40%. If the content of the electrolyte is greater than 40%, the risk of combustion of the electrolyte is increased when under heat. That is, when a content ratio of the electrolyte to the conductive solid layer is 4:6, the semi-solid electrolytic capacitor can possess a wider working voltage range and become more reliable. The manufacturing costs of the capacitor can also be decreased.

By undergoing the impregnation and baking processes for multiple times, the dispersants that include different components can be formed into the conductive solid layer of the present disclosure. In this way, improved electrical properties can be obtained. When said conductive solid layer is used in cooperation with the electrolyte of the present disclosure (which has a specific composition) for manufacturing the semi-solid electrolytic capacitor, the stability of the semi-solid electrolytic capacitor can be further enhanced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for manufacturing a semi-solid electrolytic capacitor, comprising:

providing a capacitor element;

impregnating the capacitor element with a dispersant, wherein the dispersant is a conductive polymer formed from a polymerizing monomer that includes at least one of polythiophene and polyselenophene;

baking the capacitor element impregnated with the dispersant, so as to form a conductive solid layer;

impregnating the baked capacitor element with an electrolyte, so that the electrolyte seeps into a gap of the conductive solid layer; and packaging the capacitor element impregnated with the electrolyte, wherein the polythiophene has at least one sulfonic acid group shown in formula (VII), and the polyselenophene has at least one sulfonic acid group shown in formula (XIII), formula (VII)

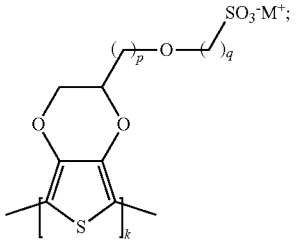

-continued formula (XIII)

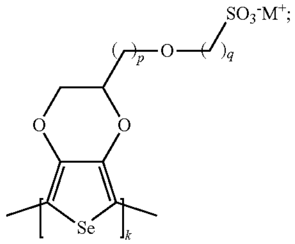

wherein $M^+$ is a metal cation selected from the group consisting of lithium ion, sodium ion, potassium ion, or ammonium ion, p is an integer ranging from 0 to 6, q is 0 or 1, and k is an integer ranging from 1 to 50.

2. The method according to claim 1, wherein the dispersant contains a first dispersant and a second dispersant, and the polymerizing monomer of the first dispersant is different from the polymerizing monomer of the second dispersant.

3. The method according to claim 2, wherein the capacitor element is impregnated with the first dispersant for one to three times, and is then impregnated with the second dispersant for one to three times.

4. The method according to claim 2, wherein the capacitor element is alternately impregnated with the first dispersant and the second dispersant for one to three times.

5. The method according to claim 1, wherein a conductivity of the electrolyte ranges between 0.01 mS and 2 mS.

6. The method according to claim 1, wherein the electrolyte contains a solvent, lithium salts, and an additive, and the solvent is selected from the group consisting of γ-butyrolactone (GBL), sulfolane, ethylene glycol (EG), diethylene glycol, triethylene glycol, polyethylene glycol, and polypropylene glycol.

7. The method according to claim 1, wherein a dielectric medium of the semi-solid electrolytic capacitor is formed from the conductive solid layer and the electrolyte, and a content of the electrolyte in the dielectric medium is less than or equal to 40%.

* * * * *